United States Patent [19]

Fink et al.

[11] 4,002,186
[45] Jan. 11, 1977

[54] QUICK DISCONNECT COUPLING

[75] Inventors: David O. Fink; Stanley R. McCrary, both of Bremerton, Wash.

[73] Assignee: The United States of America as represented by the Secretary of the Navy, Washington, D.C.

[22] Filed: Oct. 10, 1975

[21] Appl. No.: 622,274

[52] U.S. Cl. .................... 137/614.03; 251/149.4; 285/80

[51] Int. Cl.² .................. F16L 29/00; F16L 37/28

[58] Field of Search .................. 251/149.1–149.9; 137/614–614.06; 285/80

[56] References Cited
UNITED STATES PATENTS

| | | | |
|---|---|---|---|
| 718,826 | 1/1903 | Dick et al. ........................... | 285/80 |
| 1,064,862 | 6/1913 | Sharp .................................. | 251/149.4 |
| 1,325,783 | 12/1919 | Gedeon ............................... | 285/80 |
| 2,218,318 | 10/1940 | Pfauser .............................. | 251/149.4 X |
| 2,451,218 | 10/1948 | Hengst ................................ | 137/614.04 |
| 2,983,526 | 5/1961 | Abbey et al. ...................... | 137/614.04 |
| 3,417,781 | 12/1968 | Gregg ................................ | 137/614.04 |
| 3,525,361 | 8/1970 | Cerbin et al. .................... | 137/614.04 |
| 3,777,771 | 12/1973 | DeVisscher .................... | 137/614.04 X |
| 3,918,492 | 11/1975 | Karcher ............................. | 137/614.04 |

*Primary Examiner*—William R. Cline
*Attorney, Agent, or Firm*—R. S. Sciascia; Charles D. B. Curry

[57] ABSTRACT

A quick disconnect coupling that may be used in fluid systems for fast connection or disconnection of hoses or hoses to pipes. The coupling is especially useful where it is necessary to avoid any leakage or spillage. The coupling employs a female section and a male section wherein both sections employ O-ring joints that permit easy hand tight assembly and disassembly without any leakage. The O-ring joints permit considerable variation in clearance between mating flanges and thus permit the use of removable locking rings to lock the flanges and prevent their relative rotation. The female section employs a ball bearing mounted rotatable nut that permits rapid connection and disconnection without spillage. The rotatable nut has minimum axial movement that permits a close diameter tolerance so that longitudinal or lateral relative motion between the female and male members will not result in leakage. Also the degree of rotation of the rotatable nut permits flow rate regulation of the fluid passing through the coupling. An internal valve actuating system permits rapid and positive actuation and provides for a double seal in the fully open position. Sealing end caps are also employed to prevent contamination from entering the disconnected female and male sections and also provide further sealing to prevent leakage.

3 Claims, 6 Drawing Figures

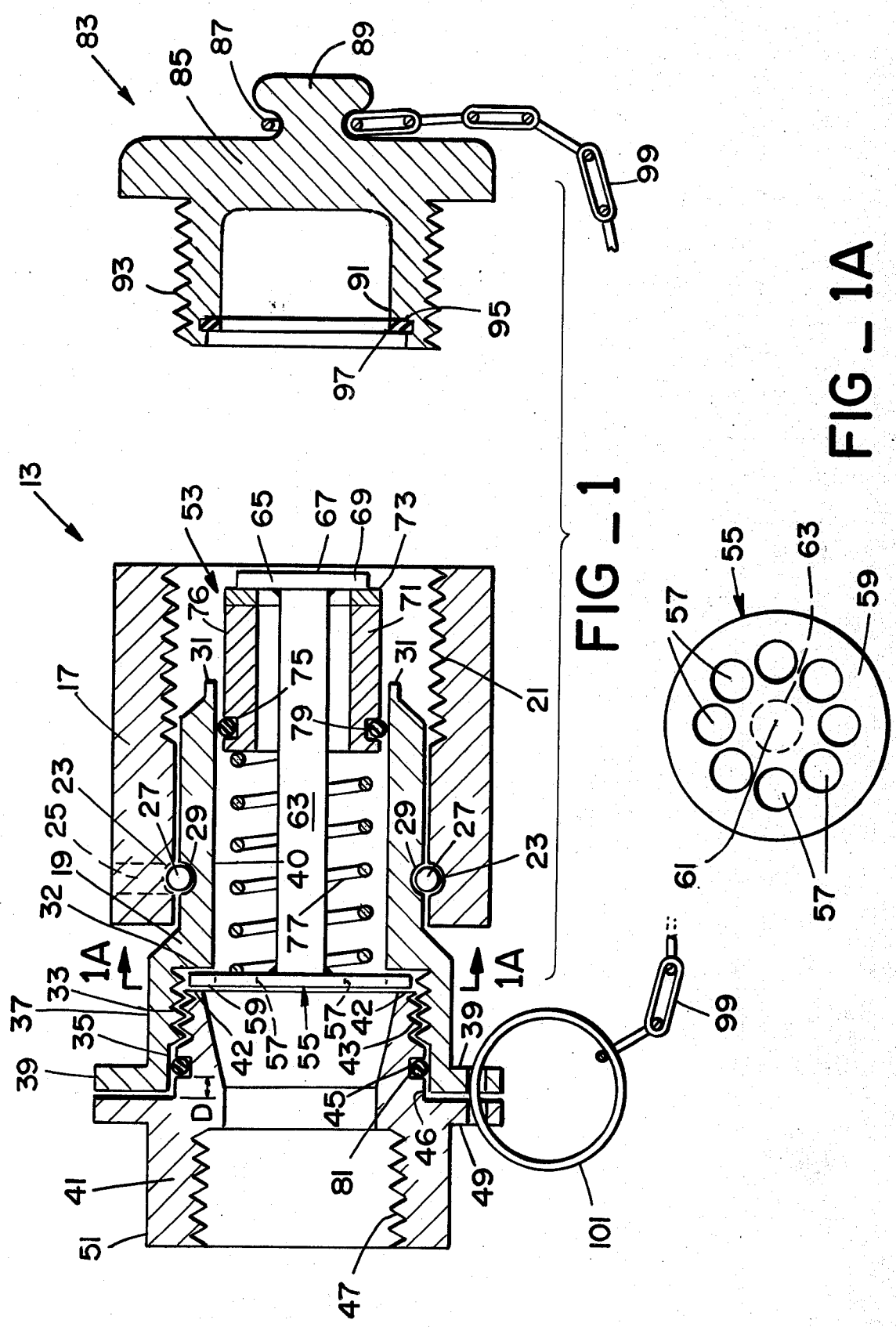

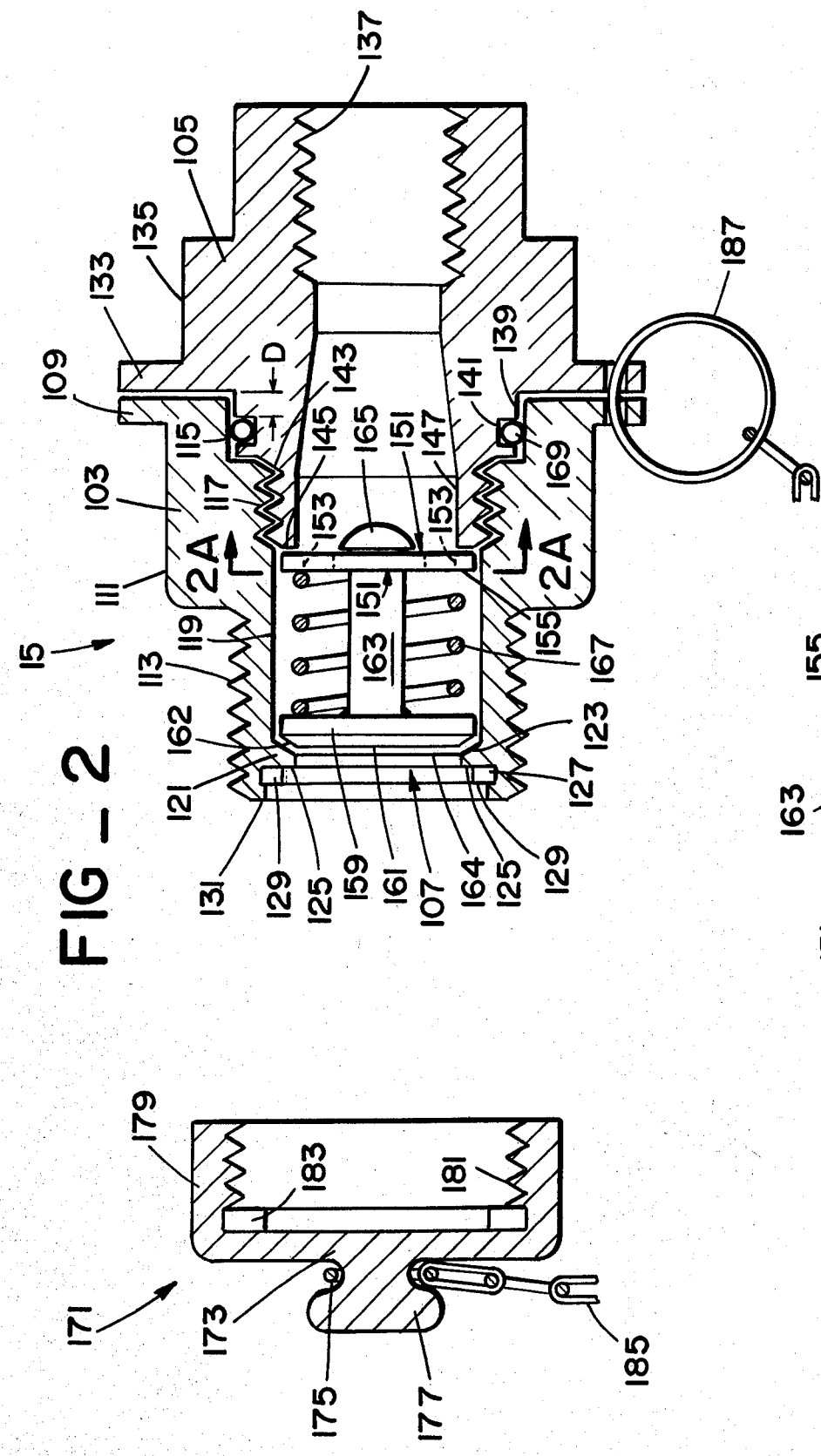

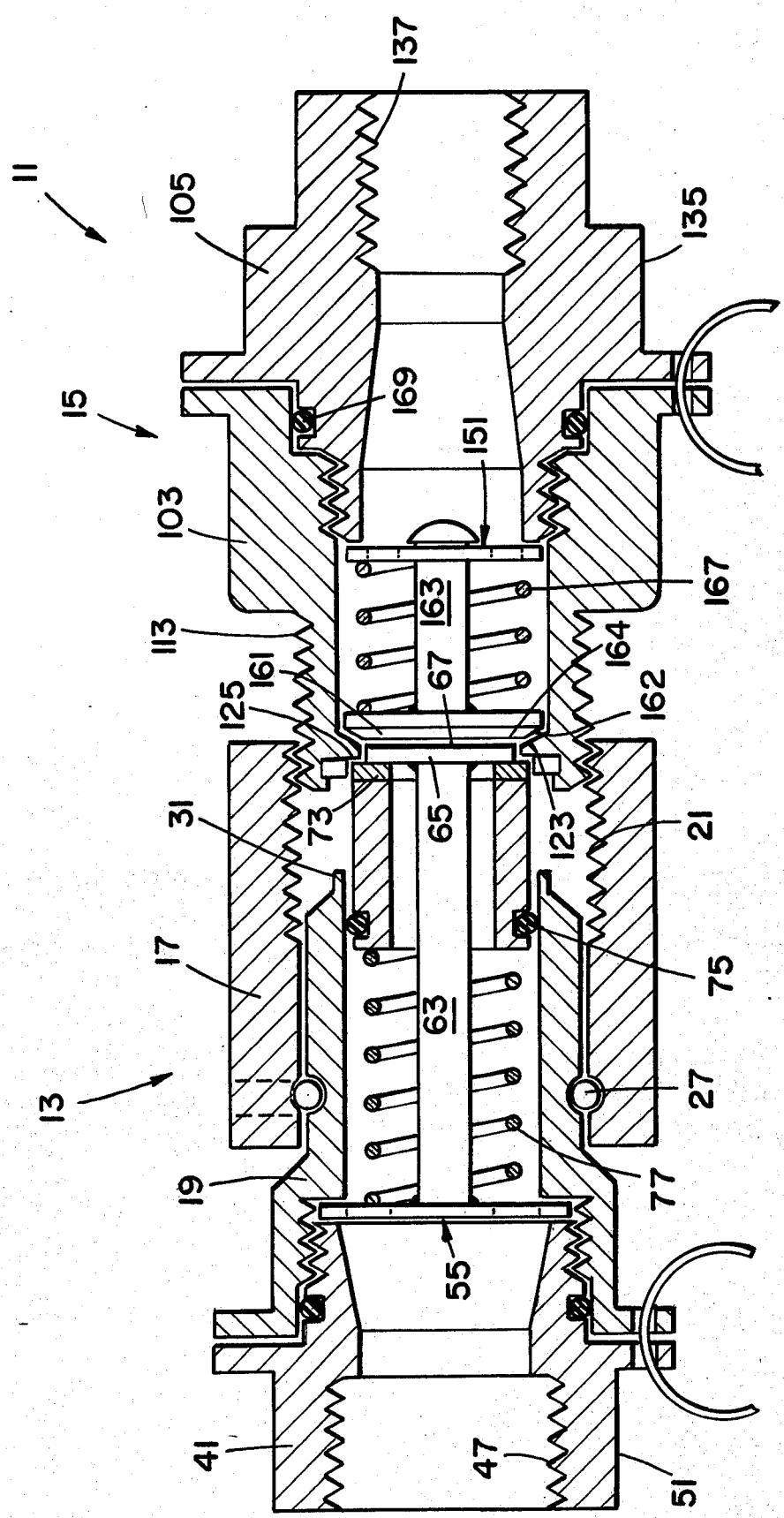
FIG_3

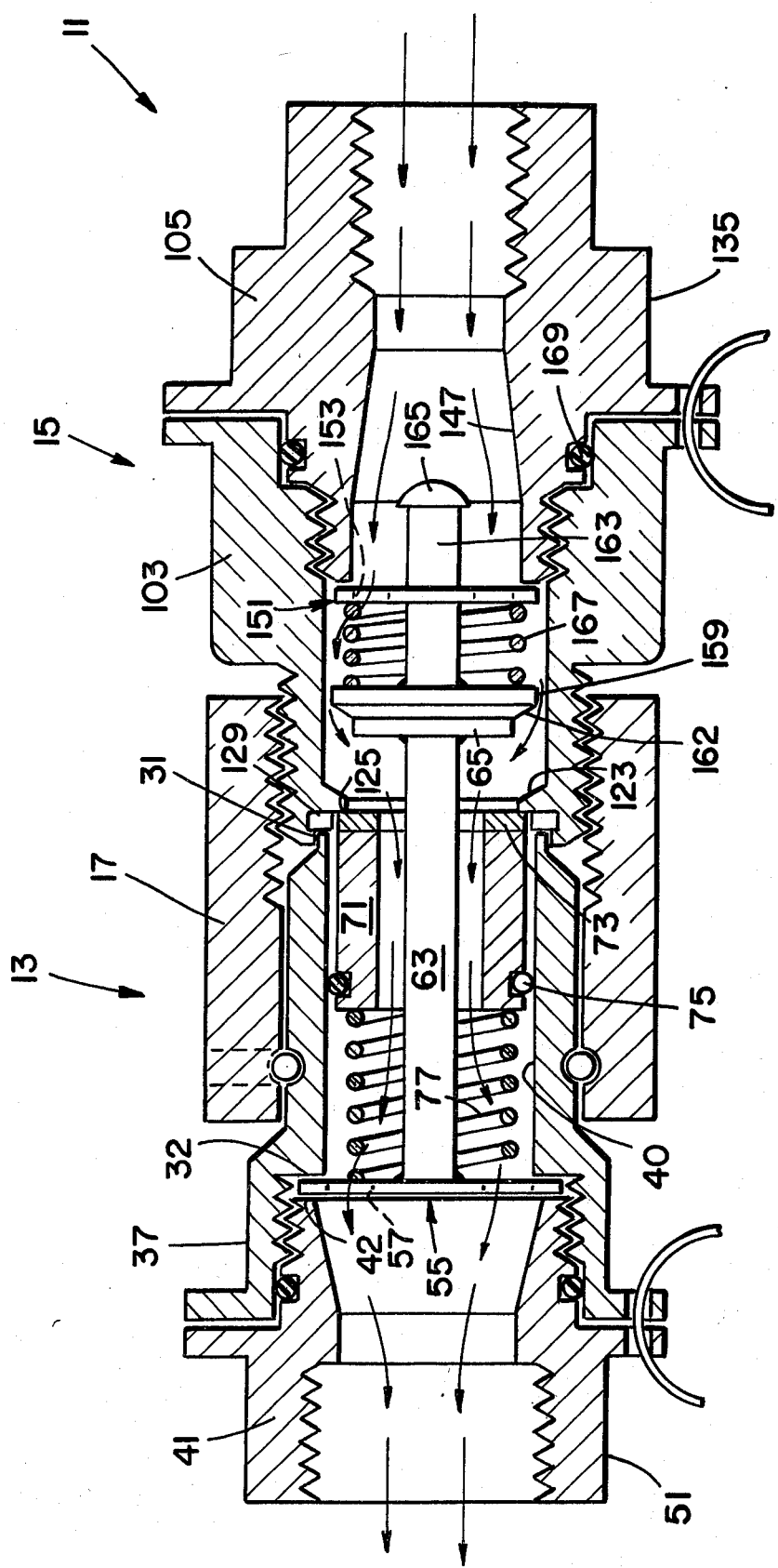
FIG_4

QUICK DISCONNECT COUPLING

BACKGROUND OF THE INVENTION

1. Field of the Invention

The present invention relates to a quick disconnect coupling and more particularly to a quick disconnect coupling that very effectively prevents leakage.

2. Description of the Prior Art

Prior disconnect couplings have proved to be unsatisfactory where it is essential that the coupling, whether in the coupled or uncoupled condition, will have no leakage or spillage. This is especially important in radioactive fluid systems where fast connection and disconnection of hoses or hoses to pipes by the coupling is required. Prior systems have required that the coupling be wrench tightened to prevent leakage while in the coupled position. Moreover, prior systems, because of their design and required relatively loose tolerances, have resulted in couplings that leak when lateral or longitudinal motions are imparted to the coupling. In addition, prior systems have often required welding of the mating flanges to prevent any rotational or lateral movement to prevent any leakage.

The present invention overcomes these difficulties by providing a fast disconnect coupling that virtually eliminates all leakage whether in the connected or disconnected position, permits hand tightening and employs a removable locking ring that is easily aligned with the flanges it is locking.

SUMMARY OF THE INVENTION

Briefly, the present invention comprises a quick disconnect coupling that may be used in fluid systems for fast connection or disconnection of hoses or hoses to pipes. The coupling is especially useful where it is necessary to avoid any leakage or spillage. The coupling employs a female section and a male section wherein both sections employ O-ring joints that permit easy hand tight assembly and disassembly without any leakage. The O-ring joints permit considerable variation in clearance between mating flanges and thus permit the use of removable locking rings to lock the flanges and prevent their relative rotation. The female section employs a ball bearing mounted rotatable nut that permits a rapid connection and disconnection without spillage. The rotatable nut has minimum axial movement that permits a close diameter tolerance so that longitudinal or lateral relative motion between the female and male members will not result in leakage. Also the degree of rotation of the rotatable nut permits flow rate regulation of the fluid passing through the coupling. An internal valve actuating system permits rapid and positive actuation and provides for a double seal in the fully open position. Sealing end caps are also employed to prevent contamination from entering the disconnected female and male sections and also provide further sealing to prevent leakage.

OBJECTS OF THE INVENTION

An object of the present invention is to provide a quick disconnect coupling that is reliable and effectively prevents leakage;

Another object of the present invention is to provide a quick disconnect coupling that can be hand tightened;

Still another object of the present invention is to provide a quick disconnect coupling that will not leak even though subjected to axial or lateral movement when in the coupled position.

A further object of the present invention is to provide a quick disconnect coupling that has a simple, effective and easy to operate coupling locking system;

Other objects, advantages and novel features of the present invention will become apparent from the following detailed description of the invention when considered in conjunction with the accompanying drawings wherein:

BRIEF DESCRIPTION OF THE DRAWINGS

FIG. 1 is a side elevation, partly in section, of the female section of the quick disconnect coupling of the present invention;

FIG. 1A is a sectional view taken at section A—A of FIG. 1;

FIG. 2 is a side elevation, partly in section, of the male section of the quick disconnect coupling of the present invention;

FIG. 2A is a sectional view taken at A—A of FIG. 2;

FIG. 3 is a side elevation, partly in section, of the female section of FIG. 1 and the male section of FIG. 2 when initially assembled and prior to opening of the valve; and FIG. 4 is a side elevation partly in section of the female section of FIG. 1 and the male section of FIG. 2 when they have been fully coupled and the valve has been fully opened.

DESCRIPTION OF THE PREFERRED EMBODIMENT

In FIGS. 1 through 4 are illustrated the quick disconnect coupling 11 of the present invention. In FIGS. 1 and 1A are illustrated the details of the female section 13 and in FIGS. 2 and 2A are illustrated the details of the male section. In FIGS. 3 and 4 are illustrated the assembled quick disconnect coupling 11 consisting of the female section 13 and the male section 15. FIGS. 3 and 4 will be hereinafter referred to when the assembled coupling and its operation are discussed.

Referring to FIG. 1 the female section 13 includes a ball bearing mounted swivel nut 17 that is rotatably mounted on cylindrical member 19. Swivel nut 17 includes female thread 21, ball bearing race 23 and a threaded opening 25 through which balls 27 are inserted.

Cylindrical member 19 includes a ball bearing race 29 which is adjacent ball bearing race 23. Balls 27 are inserted through threaded opening 25 until the cavity formed by ball bearing races 23 and 29 are filled and then a set screw, not shown, is screwed into threaded opening 25 to retain the balls in place. Cylindrical member 19 includes an inner diameter forward shoulder 31, rearward shoulder 32, female threads 33, cylindrical interior surface 35, exterior surface 37, flange 39 and inner cylindrical surface 40. Exterior surface 37 preferably has two flattened sections, not shown, so that the cylindrical member 19 may be hand or wrench tightened.

Fitting member 41 includes forward shoulder 42, male threads 43, O-ring groove 45, cylindrical exterior surface 46, female threads 47, flange 49, and exterior surface 51. Exterior surface 52 preferably has two flattened sections, not shown, so that the fitting member 41 may be hand or wrench tightened.

Positioned within cylindrical member 19 is spring loaded valve 53. Referring to FIGS. 1 and 1A spring loaded valve 53 includes a circular disc 55 having a plurality of openings 57, an outer peripheral region 59 and a central region 61. When female member 13 is assembled the outer peripheral region 59 of circular disc 55 is held in locked position between rearward shoulder 32 of cylindrical member 19 and forward shoulder 42 of fitting member 41, as depicted in FIG. 1. Spring loaded valve 53 also includes an elongated shaft 63 that has one end rigidly attached, by welding or the like to the central region 61 of circular disc 55 and the other end rigidly connected to the central region of solid circular disc 65, preferably by welding. Solid circular disc 65 has a flat forward surface 67 and an outer peripheral region 69. Spring loaded valve 53 also includes a cylindrical section 71 that includes a circular sealing ring 73, which is made of elastomeric material, positioned on the forward end of cylindrical section 71 and a circular O-ring groove 75 located in the outer rearward region of outer cylindrical surface 76 of cylindrical section 71. Spring loaded valve 53 also has a spring 77 that has its rearward surface abutting the forward surface of circular disc 55 and its forward end abutting the rearward end of cylindrical section 71. The function of spring 77 is to bias cylindrical member 71 and circular sealing ring 73 in the forward direction so that the forward inner region of circular sealing ring 73 is in sealing engagement with the rearward peripheral region 69 of solid cylindrical disc 65. An O-ring 79 is positioned within circular O-ring groove 75 to provide a seal between the inner cylindrical surface 40 of cylindrical member 19 and the outer cylindrical surface 76 of cylindrical section 71. As will be hereinafter explained by reference to FIGS. 3 and 4 cylindrical section 71 will slide rearward within cylindrical member 19 against the bias of spring 77 when a force is applied by the male section 15 of FIG. 2 against the outer forward region of circular sealing ring 73.

Referring to FIG. 1, O-ring 81 is positioned in circular O-ring groove 45 of fitting member 41. It should be particularly noted that O-ring groove is positioned at predetermined distance D from the forward surface of flange 49. This permits a sealing engagement between the O-ring 81 and cylindrical interior surface 35 even though cylindrical member 19 and fitting member 41 are only loosely connected and flanges 39 and 49 are not abutting each other and peripheral region 59 of circular disc 55 is not in abutting contact with rearward shoulder 32 of cylindrical member 19 and forward shoulder 42 of fitting member 41. This is particularly important for quick couplings because their use often involves very rapid manipulation by the workers and frequently the joints are not fully tightened.

It should be noted that threads 47 of fitting member 52 are normally connected to a conduit or the like, not shown, which contains a fluid that must be prevented from escaping through the female section 13 as illustrated in FIG. 1. As previously described, this leakage or spillage is very effectively prevented even though cylindrical member 19 and fitting member 41 are not fully tightened. However, end cap 83 is provided which includes a solid cylindrical section 85, a ring 87 and a forward enlarged section 89 for holding the ring 87 in place. The end cap also includes a rearwardly extending cylindrical section 91 having male threads 93 that engage female threads 21 of cylindrical section 17. The front end of the inner diameter of cylindrical section 91 is slightly greater than the outer diameter of forward shoulder 31 of cylindrical member 19. Positioned near the front end of section 91 is a circular groove 95 which retains an inwardly extending circular seal 97, made of elastomeric material. When end cap 83 is screwed into swivel nut 17, seal 97 engages the end of shoulder 31. This prevents any contamination from entering the female section 13 when it is not in use and also provides further assurance that there will be no leakage. It should be noted that even though circular disc 55 is loosely fitting between shoulders 32 and 42 that O-ring 79 will still provide a proper seal. End cap 83 is preferably connected to female section 13 by means of a chain 99. Female section 13 includes a removable ring 101, to which the chain is attached. Removable ring 101 passes through a pair of aligned openings in flanges 39 and 49. Each of flanges 39 and 49 may have a plurality of openings around their periphery to allow easy alignment of the openings and to permit a loose fitting engagement between cylindrical member 19 and fitting member 41. Removable ring 101 serves as a lock to prevent relative rotation between cylindrical member 19 and fitting member 41 and as well as a point of attachment for chain 99.

It should be also noted that it is preferable that a relatively close tolerance, for example about 0.002 inch, be provided between the inner diameter of swivel nut 17 and the adjacent outer diameter of cylindrical member 19. This is desirable so that female section 13 will properly mate with male section 15 for reasons which will be hereinafter explained in detail with reference to FIGS. 3 and 4.

Referring to FIG. 2, male section 15 includes a cylindrical member 103, a fitting member 105 and a spring loaded valve 107. Cylindrical member 103 includes a flange 109, an exterior surface 111, male threads 113, rearward interior cylindrical surface 115, female threads 117, forward interior surface 119, and inwardly extending cylindrical forward section 121. Forward section 121 includes a conical seat 123 and a downwardly extending cylindrical shoulder 125. A cylindrical slot 127 is provided at the forward most end of cylindrical member 103 to retain cylindrical seal 129, and flat cylindrical surface 131 forms the most forward end of member 103. Exterior surface 111 preferably has two flattened surfaces, not shown, so that cylindrical member 103 may be hand or wrench tightened.

Fitting member 105 includes flange 133, exterior cylindrical surface 135, female threads 137, an exterior cylindrical surface 139 from which cylindrical groove 141 extends, male threads 143, forward shoulder 145 and interior surface 147 which forms a passage for fluid. Exterior surface 135 preferably has two flattened surfaces, not shown, so that fitting member 105 may be hand or wrench tightened.

Positioned within cylindrical member 103 is spring loaded valve 107. Referring to FIGS. 2 and 2A spring loaded valve 107 includes a circular disc 151 having a plurality of openings 153, an outer peripheral region 155 and a central opening 157. Spring loaded valve 107 also includes circular flat plate 159, circular flat sealing member 161, made of elastomeric material, that is attached to the forward surface of flat plate 159. The outer peripheral surface 162 of sealing member 161 is preferably conical to correspond with the mating conical seat 123 of cylindrical member 103 and the forward surface 164 is circular and flat. Spring load valve 107 also includes an elongated shaft 163 that has the forward end rigidly attached to the central region of plate 159 and the rearward end section passes through opening 157 of disc 151 and has rigidly attached to the end thereof an enlayed member 165 having a diameter that is larger than central opening 157. Spring load valve 107 also includes a spring 167 that surrounds elongated shaft 163 and has the forward end abutting the outer periphery of plate 159 and the rearward end abutting the outer periphery 155 of circular disc 151. When assembled spring 167 biases disc 151 against forward shoulder 145 of fitting member 105 and biases outer peripheral conical surface 162 of sealing member 161 against conical seat 123 of cylindrical member 103.

Referring to FIG. 2, O-ring 169 is positioned in circular O-ring groove 141 of fitting member 105. It should be particularly noted that O-ring groove 141 is positioned at predetermined distance D from the forward surface of flange 133. This permits a sealing engagement between the O-ring 169 and the cylindrical interior surface 115 even though cylindrical member 103 and fitting member 105 are only loosely connected and flanges 109 and 133 are not abutting each other. As previously noted, this is particularly important for quick disconnect couplings because their use often involves very rapid manipulations by the workers and frequently the joints are not fully tightened.

It should be noted that threads 137 of coupling member 105 are normally connected to a conduit or the like, not shown, which contains a fluid that must be prevented from escaping through the male section 15 as illustrated in FIG. 2. As described above this leaking and spillage is very effectively prevented even though cylindrical member 103 and fitting member 105 are not fully tightened. However, an end cap 171 is provided which includes a solid cylindrical section 173, a ring 175 and a forward enlarged section 177 for holding the ring in place. The end cap also includes a rearwardly extending cylindrical section 179 having female threads 181 that engage male threads 113 of cylindrical section 103. The end cap includes a cylindrical seal 183 that is made of elastomeric material. When end cap 171 is screwed onto cylindrical section 103, seal 183 engages flat cylindrical surface 131 of cylindrical section 103. This prevents any contamination from entering male section 15 when it is not in use and also provides further assurance that there will be no leakage. End cap 171 is preferably connected to male section 15 by means of a chain 185. Male section 15 includes a removable ring 187 to which the chain is attached. Removable ring 187 passes through a pair of aligned openings in flanges 109 and 133. Each of flanges 109 and 133 may have a plurality of openings around their periphery to allow easy alignment of the openings and to permit a loose fitting engagement between cylindrical member 103 and fitting member 105. Removable ring 187 serves as a lock to prevent relative rotation between cylindrical member 103 and fitting member 105 and as a point of attachment for chain 185.

OPERATION

In FIGS. 3 and 4 are illustrated the operation of the quick disconnect coupling 11 of the present invention. In FIGS. 1 and 1A the details of the female section 13 of the disconnect coupling were discussed and in FIGS. 2 and 2A the details of the male section 15 of the disconnect coupling were discussed. The female section 13 and the male section 15 together make up the quick disconnect coupling 11 the operation of which will now be described with respect to FIGS. 3 and 4. For reasons of clarity only the more essential elements of the female section 13 and male section 15 of quick disconnect coupling 11 will be shown and referred to in FIGS. 3 and 4, the details of which were shown and described in FIGS. 1, 1A, 2 and 2A.

In FIG. 3 the female section 13 and the male section 15 are shown to be initially engaged and in the ready position for full operation which is shown in FIG. 4. Female section 13, including cylindrical member 19 and fitting member 41, are completely engaged and threads 47 of fitting member 41 are in engagement with a conduit, not shown. In like manner, male section 15, including cylindrical member 103 and the fitting member 105, are completely engaged and threads 137 of fitting member 105 are in engagement with a conduit, not shown. To achieve the initial position shown in FIG. 3, male section 15 and female section 13 were held stationary with the male threads 113 of cylindrical section 103 held in initial engagement with the female threads 21 of rotatable nut 17. Then rotatable nut 17 was rotated, preferably one or two revolutions, until the various parts of the quick disconnect coupling 11 occupied the position shown in FIG. 3. In this position the flat forward surface 164 of sealing member 161 is in initial engagement with the forward flat surface 67 of circular disc 65. In addition, cylindrical shoulder 125 of cylindrical member 103 is in initial engagement with the forward outer periphery of circular sealing ring 73. At this position no fluid will pass through the coupling for the reasons previously described with reference to female section 13 and male section 15. It is desirable that rotatable nut 17 have close tolerances (from about 0.001 to about 0.005 inch) since, if it did not, then lateral relative motion between female section 13 and male section 15, as shown in FIG. 3, could cause an undesirable break in seals between disc 65 and seal 73 or between conical seal 123 and surface 162 of sealing member 161.

In FIG. 4 is illustrated the relative position of the various members of the quick disconnect coupling 11 when in the fully open position. This fully open position is achieved by continued rotation of rotatable nut 17, holding the remainder of the female and male sections stationary. Rotation of rotatable nut 17 causes cylindrical member 103 of male section 15 to move to the left or into female section 13. When this occurs the left or inward lateral movement of shoulder 125 against the outer periphery of sealing ring 73 causes cylindrical section 71 to move to the left against the bias of spring 77, which is not compressed, and breaks the seal between circular disc 65 and sealing ring 73. It should be noted that disc 65 will remain stationary during this operation since it is held in place by shaft 63 and disc 55, which is clamped in place between rearward shoulder 32 and forward shoulder 42.

As previously explained, circular disc 65 remains in a fixed position. Therefore, since the disc 65 and sealing member 161 are in facial contact, the left or inward motion of cylindrical member 103 will cause sealing member 161, flat plate 159 and elongated shaft 163 to remain stationary while cylindrical member 103 and fitting member 105 have relative movement to the left or inward. Therefore, the seal between conical seat 123 and conical sealing surface 162 is broken. It should be noted that in the fully open position of FIG. 4 that the seal 129 is in sealing emgagement with shoulder 31 to provide a double seal in conjunction with O-ring 75.

In view of the above it can be seen that fluid may now flow from right to left or from left to right, depending upon the relative pressure differential between the attached conduits. In FIG. 4 it is assumed that the fluid will move from right to left as shown by the broken arrows. The fluid will pass through fitting member 105, openings 152 in disc 151, through loops of spring 167 (the spring being preferably made of small gage wire having very few loops so that it does not become fully compressed), through the illustrated cavities formed in male section 15 and female section 13, through openings 57 of disc 55 and out through fitting member 41.

The particular flow rate may be adjusted by adjusting the degree of rotation of rotatable nut 17 and the corresponding degree of inward travel of male section 15 into female section 13. The disassembly of the parts of the quick disconnect coupling 11 is opposite from the described assembly of parts and therefore will not be described.

What is claimed is:
1. A quick disconnect coupling comprising:
a. a female section and a male section;
b. said female section including a cylindrical member, a fitting member, a rotatable nut and a spring loaded valve;
c. said cylindrical member having a first section at one end and a second section at the other end;
d. said first section including an interior cylindrical surface and an adjacent flange;
e. said fitting member including an exterior cylindrical surface and an adjacent flange;
f. said interior cylindrical surface having a larger diameter than said exterior cylindrical surface and being positioned exterior of and co-extensive with respect to said exterior cylindrical surface;
g. a cylindrical groove formed inwardly from said exterior cylinder surface and positioned a predetermined distance from the flange of said fitting member;
h. a circular seal positioned in said groove and slidably engaging said interior cylindrical surface;
i. said second section of said cylindrical member including an exterior cylindrical surface, an interior cylindrical surface, and a circular shoulder depending from the end of said second section, said circular shoulder having a diameter that is less than the diameter of said second exterior surface of said second section;
j. said rotatable nut including an interior cylindrical surface at one end and female threads at the other end, a first cylindrical bearing race formed outwardly from said interior cylindrical surface of said rotatable nut, said cylindrical member having a second cylindrical bearing race formed inwardly from said second exterior cylindrical surface, said first and second bearing races being adjacent and filled with bearing balls, said interior cylindrical surface of said rotatable nut having a diameter of from about 1 to 5 thousandths of an inch greater than said exterior cylindrical surface of said second section;
k. said spring loaded valve including a cylindrical seal, said valve being positioned within said cylindrical member and having said seal in slidable engagement with said interior cylindrical surface of said second section;
l. said male member including a circular seal for engaging said circular shoulder; and
m. means for engaging said female section and said male section.

2. The coupling of claim 1 wherein:
a. said male member includes a cylindrical member, a fitting member and a spring loaded valve;
b. said cylindrical member having an interior cylindrical surface and an adjacent flange at one end;
c. said fitting member including an exterior cylindrical surface and an adjacent flange at one end;
d. said interior cylindrical surface having a larger diameter than said exterior cylindrical surface and being positioned exterior of and co-extensive with respect to said exterior cylindrical surface;
e. a cylindrical groove formed inwardly from said external cylindrical surface and positioned a predetermined distance from the flange of said fitting member; and
f. a circular seal positioned in said groove and slidably engaging said interior cylindrical surface.

3. The coupling of claim 2 wherein:
a. the other end of said cylindrical member includes male threads; and
b. said male threads having a diameter and thread size for cooperating with said female threads of said rotatable nut.

* * * * *